June 15, 1948.  F. LE B. LORD  2,443,466
LOCKING, THREADING INSERT
Filed Jan. 29, 1946  3 Sheets-Sheet 1

INVENTOR.
Francis Le Barron Lord
BY
Edward G. Roe
Attorney

June 15, 1948.  F. LE B. LORD  2,443,466
LOCKING, THREADING INSERT
Filed Jan. 29, 1946  3 Sheets-Sheet 2

INVENTOR
Francis Le Barron Lord
BY Edward G. Roe
Attorney

June 15, 1948. F. LE B. LORD 2,443,466
LOCKING, THREADING INSERT
Filed Jan. 29, 1946 3 Sheets-Sheet 3

INVENTOR.
Francis Le Barron Lord
BY
Edward G. Roe
Attorney

Patented June 15, 1948

2,443,466

UNITED STATES PATENT OFFICE 2,443,466

LOCKING, THREADING INSERT

Francis Le Barron Lord, Orange, N. J., assignor, by direct and mesne assignments, of one-eighth to Cyril G. Aschenback, New York, N. Y., one-eighth to Eugene Carbaugh, Maplewood, N. J., and one-fourth to Eloise T. Roe, Pleasantville, N. Y.

Application January 29, 1946, Serial No. 644,072

3 Claims. (Cl. 151—21)

The invention pertains to locking threading inserts, that can be made of fragile or other material. By fragile the applicant means plastics, magnesium or aluminum. It is one of the objects of the invention to complete a unitary condition between a stud or screw and the object in which it is fastened; to prevent fracture or breakage of the object thru partial connection of threaded area.

Under present conditions the maximum contact is 37% using number 5 fit; that is 37% with full stress on one side of the threaded area.

My invention contacts the full thread area—that is 100% contact at right angles to direction of screw, thus creating full support of all parts—thereby eliminating possible stripping of the threads.

A further object is the provision of locking inserts which cannot be shaken loose, in other words, which will remain rigid under vibration.

Among other objects are the provision of locking inserts which can be made of plastics, aluminum, magnesium and other frangible materials.

Figure 1:
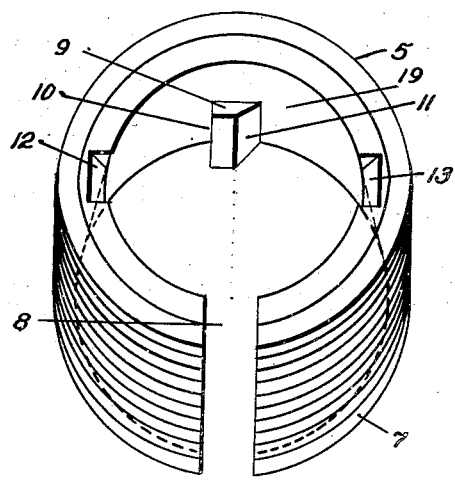
Fig. 1 is a perspective view showing the outer expandible member.
Figure 4:
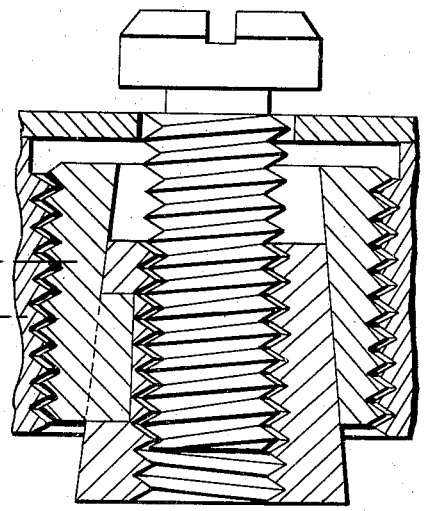
Fig. 4 is a cross section illustrating the insert in lax position.

Referring to the drawings, 5 designates the outer expandible member, externally threaded at 7, internally tapered, at 19 receding at the top, axially slit at 8, and provided with partial length key 9 extending inwardly from its inner surface at the large end. This key has abrupt face 10 on one side and beveled face 11 on the other.

The outer expandible member is also provided at its upper inner circumference with two opposing notches 12 and 13, 12 to remove the insert from fragile or other material, and 13 to implement its entrance into fragile material. The employment of these notches or slots in this manner will relieve strain from the wall of a fragile object because it bends the insert away from the wall. If both notches are employed in unison this insert would become self-tapping.

Figure 2:
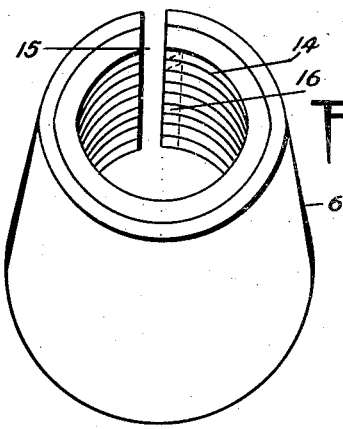
Fig. 2 is a perspective view of the inner contractible member.
Figure 5:
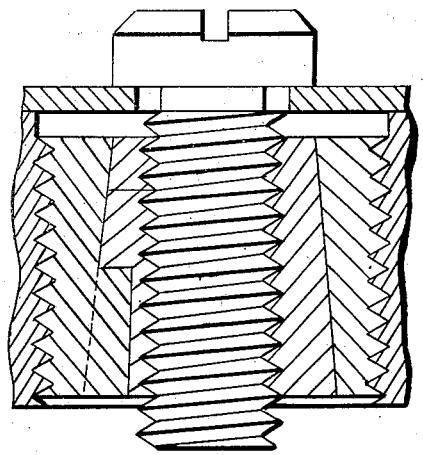
Fig. 5 is a cross section of the insert in closed position.

Coacting with the outer expandible member 5 is the inner contractible member 6, depicted in Fig. 2, and this member is internally threaded at 14, having keyway 15, and tapered to mate the taper of the expanding member 5.

Figures 19, 21:
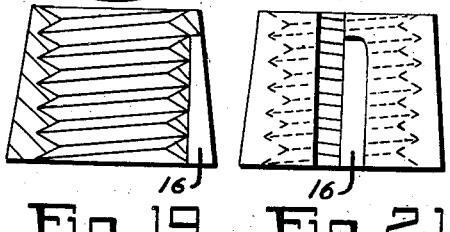
Fig. 19 is cross-section view of the inner contractible member showing partial key construction.
Fig. 21 is a side view of the inner contractible member showing partial keyway construction.

Keyway 15 is cut away for a portion of its length, at 16—illustrated in Fig. 21, the inner end of the cut away portion 16 acting as a stop for key 9 when the members are in assembled relationship, as for example, in Figs. 4, 5, 7 and 8.

Figure 3:
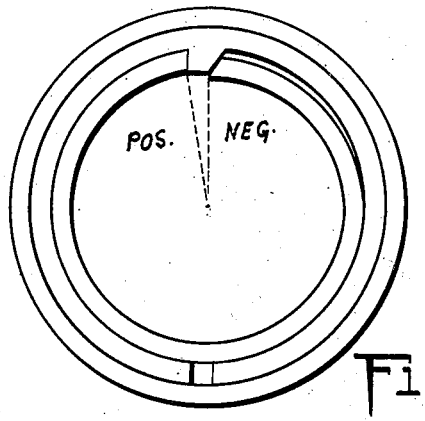
Fig. 3 is a top view of the bottom of the insert.

Referring back to abrupt face 10 and beveled face 11 of key 9, it will be noted as for example in Fig. 3 that face 10 being in advanced relation to the turn of the object screw, the screw can be fully tightened without fear of fracturing any parts because key 9 is a unitary part of member 5 and in advanced relation to the turn of object screw.

Beveled face 11 being in late relation to the turn of the object screw, will prevent unwarranted loosening due to vibratory or other effect because the beveled relation between face 11 of the key and the contacting beveled face of the cutaway portion 16 of keyway 15 will cause member 6 to seize insert 17 when the latter is loosened.

One of the features of my invention is that when entering a fragile object, as plastics, insert 17 is in lax position preventing injury to the surrounding material of object 18. This is impossible with the ordinary solid insert as allowance must be made for clearance between the threads of the insert and object, as depicted in the left hand portion of Fig. 6. Note that the pitch diameter of the female member is greater than the pitch diameter of the male in the left hand portion of Fig. 1, permitting unequal expansion and contraction. With my invention as shown on the right hand of Fig. 6, this condition does not exist due to full contact area and equal pitch diameter of male and female members.

As the screw is applied it enters free. As the screw is tightened the inner member contracting and outer member expanding, both create a multiplying pressure at right angles to the axis of the screw and object, due to angular relation. This positively closes out all open thread area between all objects. This device can be tightened twice as tight as standard pipe thread due to angular relation containing one-half the resistance as the thread area. In explanation, as shown on right hand side of Fig. 6, the thread area is twice the surface of angle area, that is, the angle between members 5 and 6. In this particular drawing the angle between members 5 and 6 is 2½ inches long—there are 10 thread surfaces, each of ½ inch—with a resulting total of five inches.

Figure 6:
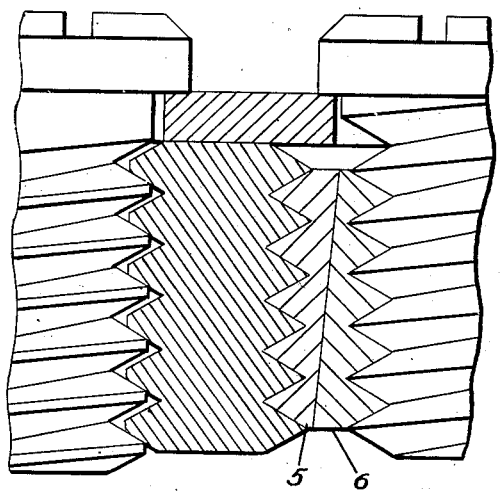
Fig. 6 is a cross section comparison view showing ordinary threading, on the left, and applicant's principal at the right.
Figure 9:
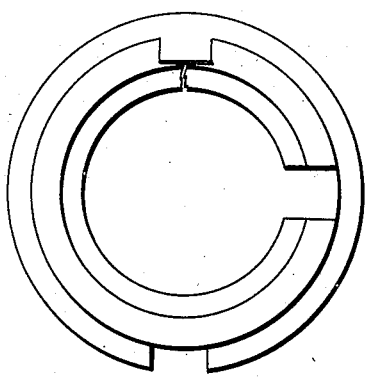
Fig. 9 illustrates the abrupt key applied to wrapping principal which creates weak area in the contractible member.

As can be seen in Fig. 6, the partial contact of thread area in the ordinary thread in common use makes it impossible to employ fragile material, as plastics.

As will be noted on the right of Fig. 6—full contact area is shown but it is also possible to employ a full V thread under this system. The pressure is multiplied at right angles to the axis of the locking inserts depending upon the degree of angle. This sketch is a 5 to 1 ratio which means that pressure is 5 times as great at right angles to the axes as it is with the axes.

Figs. 12, 13, 14 and 15 illustrate the manner in which strain and friction is eliminated by reason of the bending action of the outer expandible member 5, thus positively precluding the possibility of fracturing or shearing the fragile material of object 17.

Figure 16:
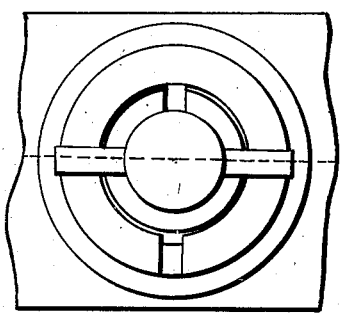
Fig. 16 is a top view of double key for self-tapping insert.
Figure 13:
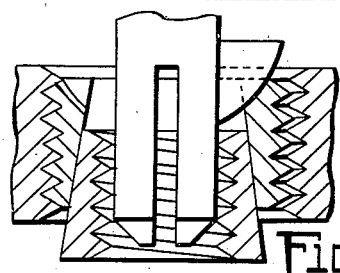
Fig. 13 is a cross-section view of same function.
Figure 17:
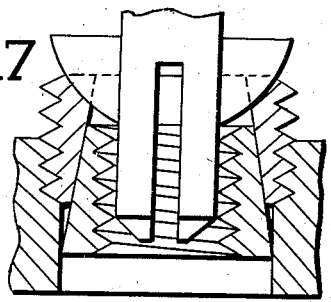
Fig. 17 is a cross-section view taken along dotted center line of Fig. 16.
Figure 14:
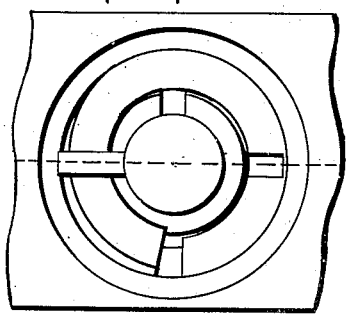
Fig. 14 is a top view of insert being removed from side wall of fragile object.
Figure 15:
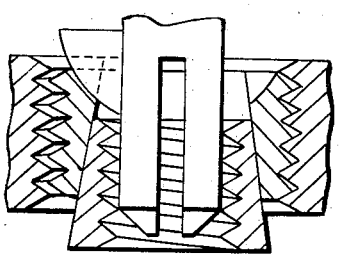
Fig. 15 is a cross-section view illustrating same function as Fig. 14.
Figures 18, 20:
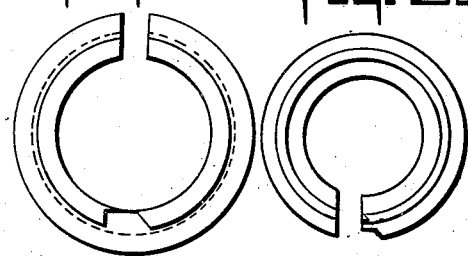
Fig. 18 is the outer ring showing partial key construction.
Fig. 20 is a top view of the inner contractible member showing partial key construction.

On Figs. 16 and 17 the release effect of the outer expandible member 5 is not apparent, due to the use of a double key by employment of notches 12 and 13; this member 5 maintains its own diameter and it will cut its own thread. In this connection for member 5 to be self-tapping it must be made of steel or other hard material.

Figure 7:
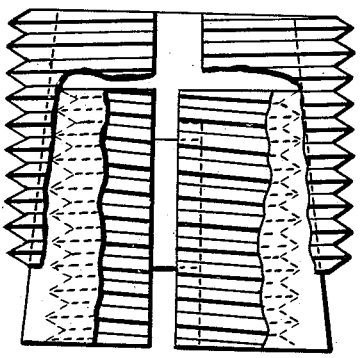
Fig. 7 is a cut-away view of the complete insert in lax position showing all phases including key system to eliminate pulling apart.
Figure 10:
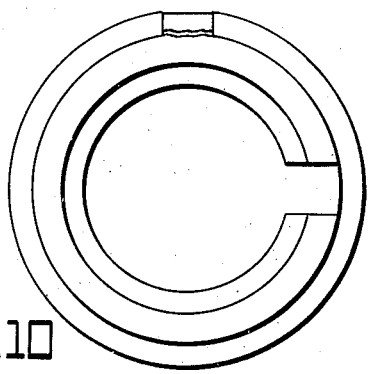
Fig. 10 is the beveled key. This form due to radius bending from the key does not support it and is subject to breakage at that point.
Figure 8:
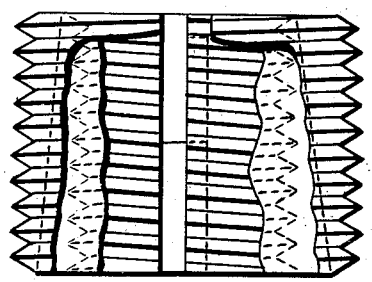
Fig. 8 is the same as Fig. 7 but in closed position.
Figure 11:
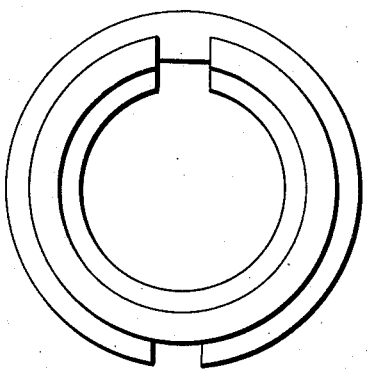
Fig. 11 illustrates applicant's principal of the present invention—with no weak spots in either ring.
Figure 12:
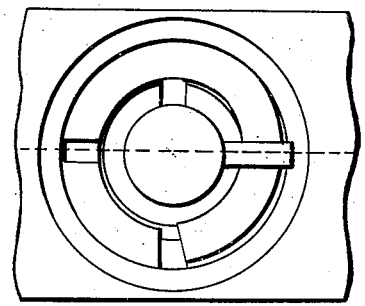
Fig. 12 is a top view of insert with key in entrance position showing release from wall of fragile material.

The functions of the partial key are illustrated in Figs. 18, 19, 20, and 21 and said functions have been referred to herein before. As was stated in the introduction, one of the objects of the invention is the provision of locking inserts which can be made of plastics, aluminum, magnesium or other materials. This is possible because the outer expandible member 5, the inner contractible member 6 and insert 16 are self-supporting and the construction is such that there are no weak spots, as illustrated in Figs. 6, 7, and 11.

In its broader aspects, the invention comprehends the employment not only of the means described, but of equivalent means for performing the recited functions. It is desired to reserve the right to effect such changes as may fairly come within the scope of the appended claims.

I claim:

1. A locking, threading insert comprising an outer expandible member for engagement with and protection of a threaded object, said member externally threaded, internally tapered, axially slit and provided with a partial length key extending from the large end of the bore, said key having an abrupt and a beveled face, a cooperating inner contractible member, internally threaded, tapered to mate the taper of the expandible member, having a keyway and a beveled cut away portion cooperating with the beveled face of the key, the inner end of the cut away portion acting as a stop for the key when the members are in assembled relationship, the abrupt face of the key of the expandible member adapted to tighten an object screw and the beveled face of the key coacting with the beveled face of the cut away portion of the keyway of the contractible member to prevent loosening through vibratory effect.

2. A locking, threading insert, comprising an outer expandible member for engagement with and protection of a fragile threaded object, said member externally threaded, internally tapered, axially slit and provided with a key extending from the large end of the bore, said key having an abrupt and a beveled face, the small end of the expandible member provided with opposing notches, one notch for removing said member, the other to implement its entrance into a fragile object, a cooperating inner contractible member, internally threaded, tapered to mate the taper of the expandible member having a keyway and a beveled cut away portion cooperating with the beveled face of the key, the inner end of the cut away portion acting as a stop for the key when the members are in assembled relationship.

3. A locking, threading insert, comprising an outer expandible member for engagement with and protection of a fragile threaded object, said member externally threaded, internally tapered, axially slit and provided with a partial length key extending from the large end of the bore, said key having an abrupt and a beveled face, the small end of the expandible member provided with opposing notches, one notch for removing said member, the other to implement its entrance into a fragile object, a cooperating inner contractible member, internally threaded, tapered to mate the taper of the expandible member having a keyway and a beveled cut away portion cooperating with the beveled face of the key, the inner end of the cut away portion acting as a stop for the key when the members are in assembled relationship, and when both of said notches are employed to insert said member, the latter becomes self-tapping.

FRANCIS LE BARRON LORD.

REFERENCES CITED

The following references are of record in the file of this patent:

UNITED STATES PATENTS

| Number | Name | Date |
|---|---|---|
| 1,779,896 | Winter | Oct. 28, 1930 |
| 2,177,800 | Chapman | Oct. 31, 1939 |
| 2,384,953 | Miller | Sept. 18, 1945 |
| 2,403,810 | Lord | July 9, 1946 |

FOREIGN PATENTS

| Number | Country | Date |
|---|---|---|
| 338,674 | Great Britain | Nov. 27, 1930 |

Certificate of Correction

Patent No. 2,443,466.

June 15, 1948.

FRANCIS LE BARRON LORD

It is hereby certified that errors appear in the above numbered patent requiring correction as follows: In the grant, lines 3 and 15, and in the heading to the printed specification, line 5, for the name "Aschenback" read *Aschenbach*; in the grant, line 5, for "Pleansantville" read *Pleasantville*; and that the said Letters Patent should be read with these corrections therein that the same may conform to the record of the case in the Patent Office.

Signed and sealed this 24th day of August, A. D. 1948.

[SEAL]

THOMAS F. MURPHY,
*Assistant Commissioner of Patents.*